US012635806B2

(12) United States Patent
Tar et al.

(10) Patent No.: US 12,635,806 B2
(45) Date of Patent: May 26, 2026

(54) SUPPORT CUSHIONS INCLUDING A SUPPORT INSERT SURROUNDED BY FOAM RAILS FOR DIRECTING AIR FLOW, METHODS FOR CONTROLLING SURFACE TEMPERATURE OF SAME, AND METHODS FOR MANUFACTURING SAME

(71) Applicant: Sealy Technology LLC, Trinity, NC (US)

(72) Inventors: Kevin Tar, Summerfield, NC (US); Maggie Mae Anderson, Thomasville, NC (US); Eric Leibee, Lexington, KY (US); Alanda Tar, Summerfield, NC (US)

(73) Assignee: SEALY TECHNOLOGY LLC, Trinity, NC (US)

( * ) Notice: Subject to any disclaimer, the term of this patent is extended or adjusted under 35 U.S.C. 154(b) by 745 days.

(21) Appl. No.: 17/869,509

(22) Filed: Jul. 20, 2022

(65) Prior Publication Data

US 2024/0023721 A1 Jan. 25, 2024

(51) Int. Cl.
*A47C 21/04* (2006.01)
*A47C 27/05* (2006.01)
(Continued)

(52) U.S. Cl.
CPC ............ *A47C 21/044* (2013.01); *A47C 27/05* (2013.01); *A47C 27/144* (2013.01); *A47C 27/15* (2013.01);
(Continued)

(58) Field of Classification Search
CPC ..... A47C 21/044; A47C 27/05; A47C 27/144; A47C 27/15; B32B 37/1207;
(Continued)

(56) References Cited

U.S. PATENT DOCUMENTS

| | | | | |
|---|---|---|---|---|
| 4,449,261 A | * | 5/1984 | Magnusson | A47C 27/066 5/722 |
| 5,887,304 A | * | 3/1999 | von der Heyde | A47D 15/001 5/724 |

(Continued)

FOREIGN PATENT DOCUMENTS

| | | |
|---|---|---|
| KR | 10-2022-0081686 A | 6/2022 |
| WO | 2021138527 A2 | 7/2021 |

OTHER PUBLICATIONS

Korean Intellectual Property Office, Ministry of Intellectual Property, Office Action (Notice 1 to Submit a Response) issued in corresponding Application No. 10-2025-7004262 dated Feb. 11, 2026.

*Primary Examiner* — Fredrick C Conley
(74) *Attorney, Agent, or Firm* — Stites & Harbison, PLLC; Terry L. Wright

(57) ABSTRACT

A support cushion for providing individualized heating and cooling to a user resting on the support cushion is provided. The support cushion includes a body supporting layer and an air distribution layer positioned adjacent to the body supporting layer. The air distribution layer includes a base plate and foam rails positioned at least around a perimeter of the base plate to define a cavity with a support insert positioned within the cavity. A fan is operably connected to the air distribution layer and provides air flow into the cavity of the air distribution layer. Air flow is directed through the support insert and into and through the body supporting layer.

21 Claims, 6 Drawing Sheets

(51) Int. Cl.

| | |
|---|---|
| *A47C 27/14* | (2006.01) |
| *A47C 27/15* | (2006.01) |
| *B32B 3/26* | (2006.01) |
| *B32B 5/18* | (2006.01) |
| *B32B 5/32* | (2006.01) |
| *B32B 37/12* | (2006.01) |

(52) U.S. Cl.
CPC ................ *B32B 3/266* (2013.01); *B32B 5/18* (2013.01); *B32B 5/32* (2013.01); *B32B 37/1207* (2013.01); *B32B 2037/1215* (2013.01); *B32B 2250/22* (2013.01); *B32B 2266/0221* (2013.01); *B32B 2266/0228* (2013.01); *B32B 2266/025* (2013.01); *B32B 2266/0278* (2013.01); *B32B 2307/536* (2013.01); *B32B 2307/72* (2013.01); *B32B 2307/7242* (2013.01); *B32B 2601/00* (2013.01)

(58) Field of Classification Search
CPC ...... B32B 2037/1215; B32B 2266/025; B32B 2307/536; B32B 2307/7242

See application file for complete search history.

(56) References Cited

U.S. PATENT DOCUMENTS

| | | | |
|---|---|---|---|
| 6,317,912 B1 * | 11/2001 | Graebe | A47C 23/047 5/655.8 |
| 9,211,017 B2 | 12/2015 | Tyree | |
| 9,603,459 B2 | 3/2017 | Brykalski et al. | |
| 9,955,791 B2 * | 5/2018 | Chandler | A47C 27/18 |
| 10,051,973 B2 | 8/2018 | Morgan et al. | |
| 10,058,190 B1 | 8/2018 | Blazar et al. | |
| 10,477,975 B2 | 11/2019 | Tursi, Jr. et al. | |
| 10,827,845 B2 | 11/2020 | Ghanei et al. | |
| 11,103,081 B2 | 8/2021 | Sherman et al. | |
| 11,160,386 B2 | 11/2021 | Jansen et al. | |
| 11,241,100 B2 | 2/2022 | Chapin et al. | |
| 11,375,825 B2 | 7/2022 | Ghanei et al. | |
| 2010/0011502 A1 * | 1/2010 | Brykalski | A61G 7/05 5/423 |
| 2011/0296611 A1 * | 12/2011 | Marquette | F24H 3/0429 165/200 |
| 2013/0269106 A1 * | 10/2013 | Brykalski | A47C 7/744 5/423 |
| 2015/0289667 A1 * | 10/2015 | Oakhill | A47C 27/18 5/423 |
| 2015/0296992 A1 * | 10/2015 | Ghanei | A47C 27/15 5/423 |
| 2015/0359351 A1 | 12/2015 | Wilder | |
| 2016/0037938 A1 | 2/2016 | Tyree | |
| 2016/0128487 A1 | 5/2016 | Eskridge, III et al. | |
| 2018/0242753 A1 * | 8/2018 | Ghanei | A47C 21/044 |

* cited by examiner

SUPPORT CUSHIONS INCLUDING A SUPPORT INSERT SURROUNDED BY FOAM RAILS FOR DIRECTING AIR FLOW, METHODS FOR CONTROLLING SURFACE TEMPERATURE OF SAME, AND METHODS FOR MANUFACTURING SAME

TECHNICAL FIELD

The present invention relates to support cushions, methods for controlling the surface temperature of support cushions, and methods for manufacturing support cushions. In particular, the present invention includes support cushions, such as mattress assemblies, that make use of a support insert surrounded by air impermeable foam rails to direct air to the surfaces of the support cushions.

BACKGROUND

An aspect of successful and restful sleep is individual sleep comfort. Medical research suggests that sleep deprivation ("sleep debt") can have significant negative impacts on longevity, productivity, and overall mental, emotional, and physical health. Chronic sleep debt has been linked to weight gain and, more specifically, has been observed to not only affect the way the body processes and stores carbohydrates, but has also been observed to alter hormone levels that affect appetite. Moreover, sleep debt may result in irritability, impatience, inability to concentrate, and moodiness, which has led some researchers to suggest a link between sleep debt and worksite accidents, traffic incidents, and general afternoon inattentiveness. Furthermore, sleep disorders have been linked to hypertension, increased stress hormone levels, and irregular heartbeat, and additional research has recently suggested that a lack of sleep can affect immune function, resulting in increased susceptibility to illness and disease, e.g., cancer. In all, researchers have now suggested that sleep debt costs the United States $63 billion annually in lost productivity due to these various effects. Accordingly, a support cushion that improves sleep comfort and lowers individual sleep debt would be both highly desirable and beneficial.

SUMMARY

The present invention includes support cushions and methods for controlling the surface temperature of support cushions. In particular, the present invention includes support cushions, such as mattress assemblies, that make use of a support insert surrounded by air impermeable foam rails to direct air to the surfaces of the support cushions. Thus, the support cushions of the present invention allow a user to individualize their level of comfort, including sleep comfort, by controlling the amount and/or temperature of the air flowing to the surface of the support cushions.

In one exemplary embodiment of the present invention, a support cushion is provided in the form of a mattress assembly that includes a body supporting layer having a first surface and a second surface opposite the first surface. An air distribution layer is positioned adjacent to the first surface of the body supporting layer, with the air distribution layer including a base plate and foam rails positioned at least around a perimeter of the base plate to thereby define a cavity. A support insert is then positioned within the cavity, and a fan is operably connected to the air distribution layer to provide air flow into the cavity of the air distribution layer.

Specifically, the air flow is directed through the support insert and into and through the body supporting layer.

In one exemplary embodiment, the foam rails include an outer foam layer and an inner foam lining. The inner foam lining defines a side surface of the cavity of the air distribution layer and the inner foam lining is substantially air impermeable. In another exemplary embodiment, the foam rails include an air impermeable coating along at least a side surface of the cavity of the air distribution layer. In yet another exemplary embodiment, the air distribution layer is formed by carving the cavity out of a unitary piece of foam such that the base plate and foam rails are integrally formed. In any event, the foam rails are substantially air impermeable and the support insert is substantially air permeable such that air provided into the cavity of the air distribution layer spreads through the support insert before flowing into and through the body supporting layer.

In one exemplary embodiment, the support insert includes an array of springs, the array of springs configured to support the body supporting layer. In another exemplary embodiment, the support insert includes one or more foam layers configured to support the body supporting layer.

The support cushion further includes an air flow unit, which is operably connected to the inlet hole of the air distribution layer. The air flow unit includes a fan which provides air flow into the interior of the support insert, and in some embodiments, further includes a heating unit and/or a cooling unit to provide thermally controlled air flow into the interior of the support insert. Substantially all of the air flowing into the support insert is directed into and through the overlying body supporting layer. To this end, in some exemplary embodiments, the body supporting layer defines a plurality of channels that extend from the first surface to the second surface. The air flowing out of the outlet hole will therefore be directed into and through the second surface of the body supporting layer via the plurality of channels.

In order to further facilitate air flow through the body supporting layer, in some embodiments, the body supporting layer is comprised of a porous visco-elastic foam. Such porous foam has characteristics that are, in some embodiments, well suited for use in the body supporting layer of the mattress assembly, including the enhanced ability to permit fluid movement through the porous foam and, consequently, the ability to provide enhanced air movement through the body supporting layer of the mattress assembly. In this regard, air exiting the support insert can then easily be transferred through the body supporting layer to the second surface. In the case where the air flow unit provides heated or cooled air into the support insert, the increased air flow through the body supporting layer will also improve the rate of heating/cooling at the first surface of the body supporting layer.

Further features and advantages of the present invention will become evident to those of ordinary skill in the art after a study of the description, figures, and non-limiting examples in this document.

DESCRIPTION OF EXEMPLARY EMBODIMENTS

The present invention includes support cushions and in particular, the present invention includes support cushions, such as mattress assemblies, that make use of a support insert surrounded by air impermeable foam rails to direct air to the surfaces of the support cushions. Thus, the support cushions of the present invention allow a user to individualize their level of comfort, including sleep comfort, by controlling the amount and/or temperature of the air flowing to the surface of the support cushions.

Figure 1:
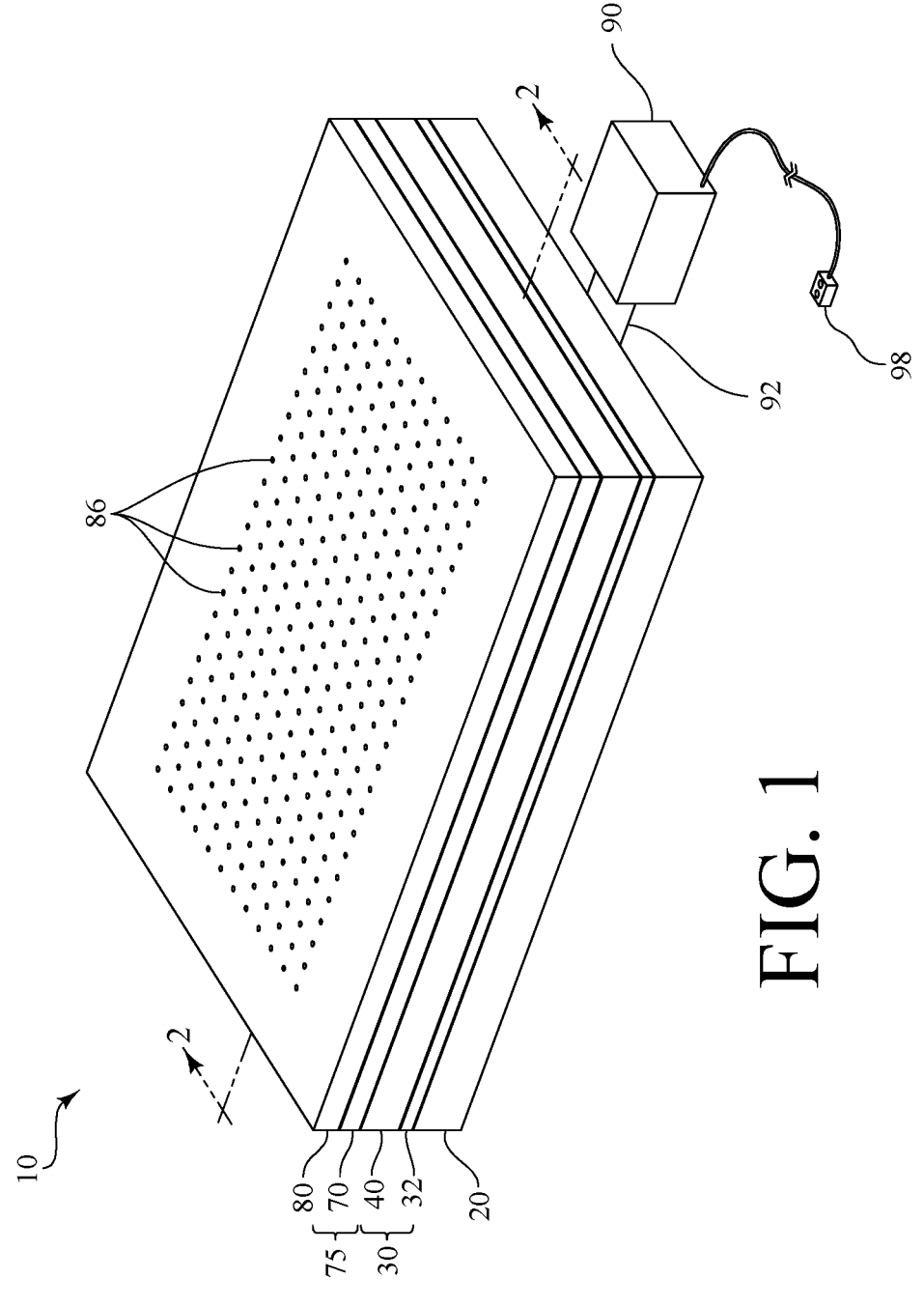
FIG. 1 is a perspective view of an exemplary support cushion, in the form of a mattress assembly, made in accordance with the present invention.
Figure 2:
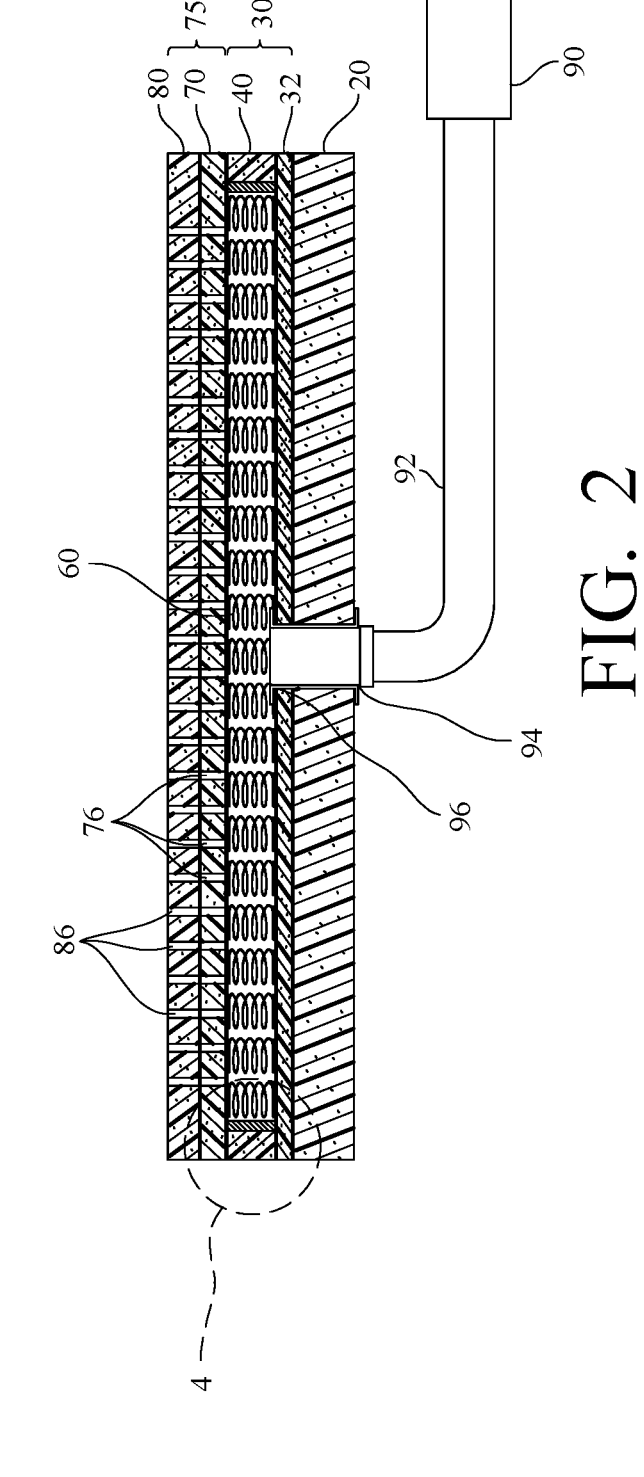
FIG. 2 is a cross-sectional view of the exemplary mattress assembly of FIG. 1 taken along line 2-2 of FIG. 1.
Figure 3:
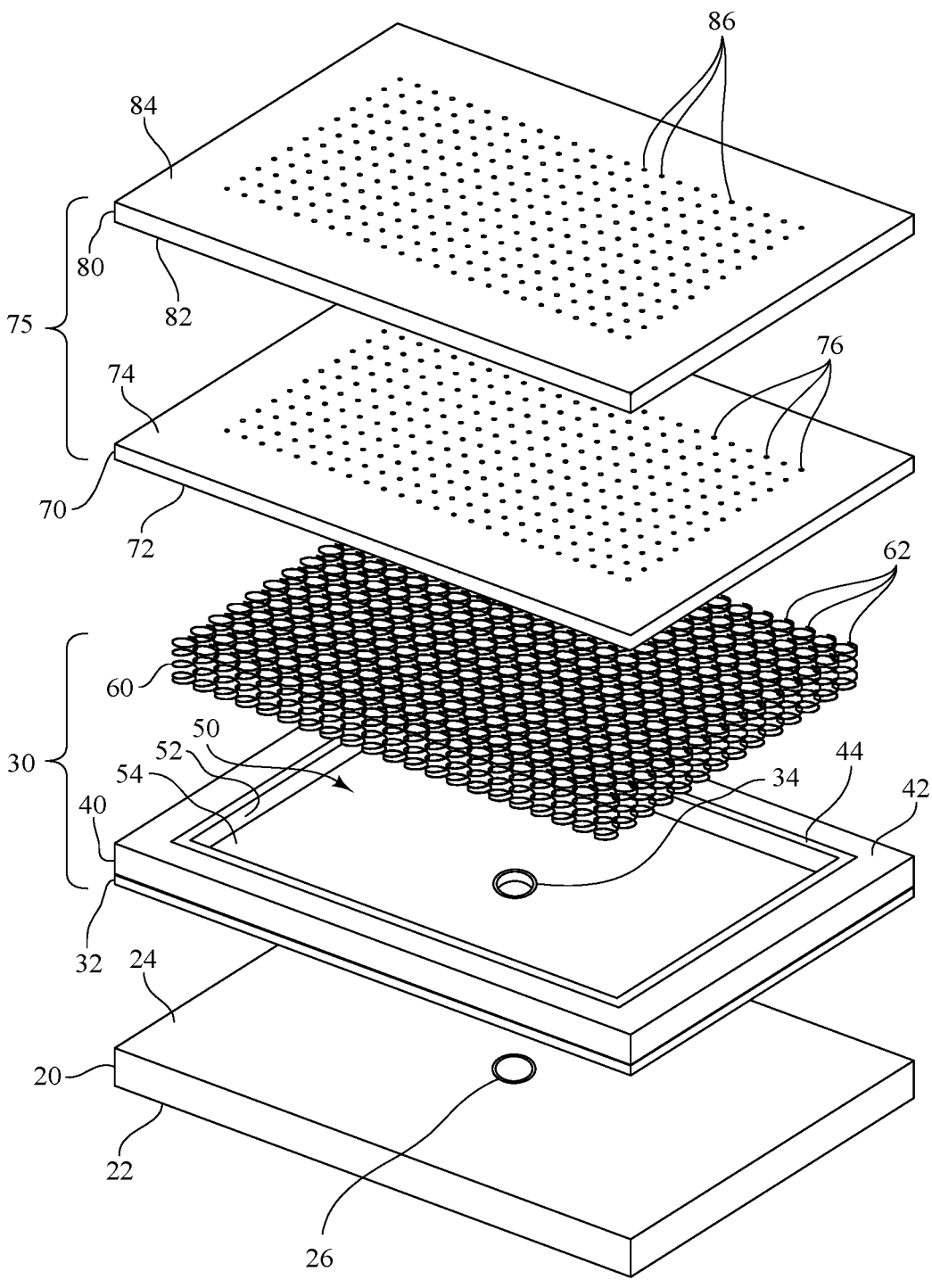
FIG. 3 is a partially exploded, perspective view of the exemplary mattress assembly of FIG. 1.

Referring first to FIGS. 1-3, in one exemplary embodiment of the present disclosure, a support cushion in the form of a mattress assembly 10 is illustrated, where the mattress assembly 10 includes an uppermost comfort layer 80 having a first surface 82 and a second surface 84 opposite the first surface 82 and an insulator layer 70 similarly having a first surface 72 and a second surface 74 opposite the first surface 72. The second surface 74 of the insulator layer 70 is positioned adjacent to the first surface 82 of the comfort layer 80. According to this exemplary embodiment, the insulator layer 70 and the comfort layer 80 are also referred to collectively as a body supporting layer 75 in which the first surface 72 of the insulator layer 70 is a first surface of the body supporting layer 75 and the second surface 84 of the comfort layer 80 is a second surface of the body supporting layer 75.

The mattress assembly 10 further includes an air distribution layer 30 positioned adjacent to the first surface 72 of the insulator layer 70 (i.e., a first surface of the body supporting layer 75) and configured to support the body supporting layer 75. As discussed further below, the air distribution layer 30 includes a base plate 32 and foam rails 40 which define a cavity 50 into which a support insert 60 is positioned. Specifically, the support insert 60 is positioned on a bottom surface 54 of the cavity 50 with a side surface 52 of the cavity 50 surrounding the support insert 60 such that only the upper side of the support insert 60 opposite from the bottom surface 54 of the cavity 50 is left exposed. Finally, the mattress assembly further includes a base layer 20 positioned adjacent to the base plate 32 of the air distribution layer 30.

The base layer 20, which may take the form of a flexible (including foam) platform structure to allow for use on an adjustable base, or a hard bottom, platform structure, or the like, provides a support surface upon which the air distribution layer 30 may sit. In some embodiments, the base layer 20 may be substantially flat and stationary; while in other embodiments, the base layer 20 may be adjustable and capable of moving from a substantially flat position to any number of inclined positions as desired by a user and known in the art. In embodiments where the base is adjustable, the mattress assembly 10 may also have locating features for aligning the mattress assembly 10 and an adjustable base (not shown). As perhaps best illustrated in FIG. 3, the base layer 20 also defines at least one hole 26 which extends from a first surface 22 of the base layer 20 to a second surface 24 of the base layer 20, as discussed further below. Although not specifically illustrated in the Figures, in some embodiments, the base layer may also be a mattress foundation, such as those utilized for use with an adjustable bed.

Referring still to FIGS. 2 and 3, as previously mentioned, the air distribution layer 30 includes a base plate 32 and foam rails 40 positioned around a perimeter of the base plate 32 so as to define a cavity 50 with a support insert 60 positioned within the cavity 50. In this exemplary embodiment, the support insert 60 is formed of an array of springs 62, but other configurations are contemplated, as discussed further below. In any event, the foam rails 40 and support insert 60 are configured to support the insulator layer 70 and the comfort layer 80 (i.e., the body supporting layer 75). As perhaps best shown in FIG. 3, the base plate 32 also defines an inlet hole 34 which is aligned with the hole 26 defined in the base layer 20.

Referring now to FIGS. 1 and 2, the mattress assembly 10 further includes an air flow unit, here shown generally as a box 90, which is operably connected to the inlet hole 34 in the base plate 32 of the air distribution layer 30 by way of a conduit 92. Specifically, as shown in FIG. 2, a flange 96 is operably connected to the inlet hole 34 with the flange 96 extending through the inlet hole 34 in the base plate 32 as well as through the hole 26 in the base layer 20. The conduit 92 includes a connector 94 at its distal end which is configured to engage the flange 96 in order to provide a continuous airway between the air flow unit 90 and the cavity 50 of the air distribution layer 30.

With respect to the air flow unit 90, although not expressly shown, the air flow unit 90 includes a fan which provides air flow into the cavity 50 of the air distribution layer 30 by way of the conduit 92. An exemplary fan for use with the air flow unit 90 provides air flow greater than about 25 CFM, greater than about 30 CFM, or greater than about 35 CFM, and has a water static pressure of less than about 50 mm, less than about 40 mm, or less than about 30 mm. One particular fan has an air flow greater than 35 CFM and less than 30 mm of water static pressure.

It is also contemplated that in some embodiments, the air flow unit 90 further includes a heating unit and/or a cooling unit to provide thermally controlled air flow into the cavity 50 of the air distribution layer 30. To this end, the exemplary mattress assembly further includes a controller 98 for controlling the air flow unit 90. By including a controller 98 in the mattress assembly 10, not only can the amount of air flow be controlled, but the temperature of the air flow can also be controlled.

Figure 4:
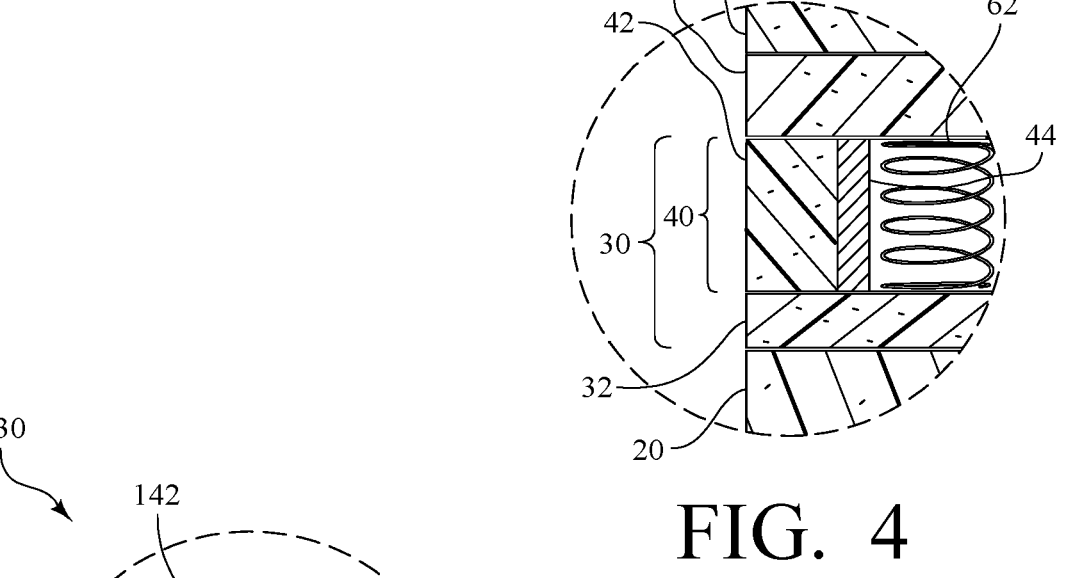
FIG. 4 is a detailed view of the portion identified in FIG. 2 focusing on the foam rail.

Referring now to FIGS. 2-4, the foam rails 40 of the air distribution layer 30 are substantially air impermeable and include an outer foam layer 42 and an inner foam lining 44 which defines the side surface 52 of the cavity 50. Each of the outer foam layer 42 and the inner foam lining 44 is made of a flexible foam, such as a latex foam, reticulated or non-reticulated visco-elastic foam (sometimes referred to as memory foam or low-resilience foam), reticulated or non-reticulated non-visco-elastic foam, polyurethane high-resilience foam, expanded polymer foams (e.g., expanded ethylene vinyl acetate, polypropylene, polystyrene, or polyethylene), or any combination thereof. While the outer foam layer 42 may be comprised of a substantially air permeable foam, the inner foam lining 44 is comprised of a foam which is substantially air impermeable. When used herein, the term "impermeable" generally refers to a material which substantially prevents the movement of air through the material, including materials that are "low permeable" and may allow some vapor to escape. For example, low permeable foams are contemplated to have, in some embodiments, air permeability between 0-0.05 Usec. Similarly, the use of the term "permeable" herein generally refers to a materially which substantially allows the movement of air through the material. Other configurations of the foam rail are discussed below with respect to FIGS. 5A and 5B, but in all instances, the foam rails are substantially air impermeable. In order to further prevent air flowing out of the air distribution layer 30 except through the body supporting layer 75, in some embodiments, the base plate 32 is also substantially air impermeable. As such, air flowing into the cavity 50 of the air distribution layer 30 cannot readily escape through a bottom or side of the air distribution layer 30. Therefore, substantially all of the air flowing into the cavity 50 of the air distribution layer 30 is directed out of the top of the air distribution layer 30 and into and through the overlying insulator layer 70 and comfort layer 80 (i.e., the body supporting layer 75).

To this end, and referring now to FIG. 2 in particular, the insulator layer 70 defines a plurality of channels 76 that extend from the first surface 72 to the second surface 74 and which are substantially aligned with cavity 50 of the air distribution layer 30. Likewise, the comfort layer 80 defines a plurality of channels 86 that extend from the first surface 82 to the second surface 84 with each of the channels 86 of the comfort layer 80 substantially aligned with a corresponding channel 76 of the insulator layer 70. Air flowing out of the cavity 50 of the air distribution layer 30 will therefore be directed to the second surface 84 of the comfort layer 80 (i.e., the second surface of the body supporting layer 75) by flowing into and through the plurality of channels 76, 86. Of course, the shape and/or pattern of channels 76 in the insulator layer 70 and the shape and/or pattern of channels 86 in the comfort layer 80 are not limited and may, in some embodiments, not be aligned. In some embodiments, the pattern of channels is designed to provide a particular cooling effect for a user resting on the support cushion.

With respect to the body supporting layer 75, in the exemplary embodiment shown in FIGS. 1-3, the insulator layer 70 and the comfort layer 80 (i.e., the body supporting layer 75) of the mattress assembly 10 are comprised of a continuous layer of flexible foam for suitably distributing pressure from a user's body or portion thereof across the body supporting layer 75. Such flexible foams include, but are not limited to, latex foam, reticulated or non-reticulated visco-elastic foam (sometimes referred to as memory foam or low-resilience foam), reticulated or non-reticulated non-visco-elastic foam, polyurethane high-resilience foam, expanded polymer foams (e.g., expanded ethylene vinyl acetate, polypropylene, polystyrene, or polyethylene), or any combination thereof. In the embodiment shown in FIGS. 1-3, the insulator layer 70 and the comfort layer 80 are comprised of a visco-elastic foam that has a low resilience as well as a sufficient density and hardness, which allows pressure to be absorbed uniformly and distributed evenly across the body supporting layer 75 of the mattress assembly 10. Generally, such visco-elastic foams have a hardness of at least about 10 N to no greater than about 80 N, as measured by exerting pressure from a plate against a sample of the material to a compression of at least 40% of an original thickness of the material at approximately room temperature (i.e., 21° C. to 23° C.), where the 40% compression is held for a set period of time as established by the International Organization of Standardization (ISO) 2439 hardness measuring standard. In some embodiments, the visco-elastic foam has a hardness of about 10 N, about 20 N, about 30 N, about 40 N, about 50 N, about 60 N, about 70 N, or about 80 N to provide a desired degree of comfort and body-conforming qualities.

The visco-elastic foam described herein for use in the mattress assembly 10 can also have a density that assists in providing a desired degree of comfort and body-conforming qualities, as well as an increased degree of material durability. In some embodiments, the density of the visco-elastic foam used in the body supporting layer 75 has a density of no less than about kg/m3 to no greater than about 150 kg/m3. In some embodiments, the density of the visco-elastic foam used in the body supporting layer 75 of the mattress assembly 10 is about 30 kg/m3, about 40 kg/m3, about 50 kg/m3, about 60 kg/m3, about 70 kg/m3, about 80 kg/m3, about 90 kg/m3, about 100 kg/m3, about 110 kg/m3, about 120 kg/m3, about 130 kg/m3, about 140 kg/m3, or about 150 kg/m3. Of course, the selection of a visco-elastic foam having a particular density will affect other characteristics of the foam, including its hardness, the manner in which the foam responds to pressure, and the overall feel of the foam, but it is appreciated that a visco-elastic foam having a desired density and hardness can readily be selected for a particular application or mattress assembly as desired. For example, the comfort layer 80 typically has a density, hardness, or both that is less than that of the insulator layer 70, such that the comfort layer 80 provides a softer surface on which to rest the body of a user or a portion thereof. Additionally, it is appreciated that the insulator layer 70 and/or the comfort layer 80 of the mattress assemblies need not be comprised of a continuous layer of flexible foam at all, but can also take the form of more traditional mattresses, including spring-based mattresses, without departing from the spirit and scope of the subject matter described herein.

In order to further facilitate air flow through the body supporting layer 75, in some embodiments, the insulator layer 70 and the comfort layer 80 are each comprised of a substantially uniform layer of a porous visco-elastic foam. In this regard, the term "porous flexible foam" (visco-elastic or otherwise) is used herein to generally refer to flexible foam having a cellular foam structure in which at least a portion of the cells of the foam are essentially skeletal. In other words, at least a portion of the cells of the foam are each defined by a plurality of apertured windows surrounded by cell struts, where the cell windows of the porous foam can be entirely absent (leaving only the cell struts) or substantially missing. In some embodiments, the foam is considered "porous" if at least 50% of the windows of the cells are missing (i.e., windows having apertures therethrough, or windows that are completely missing and therefore leaving only the cell struts). Such structures can be created by destruction or other removal of cell window material, by chemical or mechanical means, or by preventing the complete formation of cell windows during the manufacturing process of the foam. In some embodiments of the present invention, the term "porous" can thus be used interchangeably with the term "reticulated" when referring to flexible foam.

Regardless of the manufacturing process used to produce the porous foam, porous foam, by virtue of its open cellular structure, has characteristics that are well suited for use in the body supporting layer 75 of the mattress assembly 10, including the enhanced ability to permit fluid movement through the porous foam and, consequently, the ability to provide enhanced air movement through the body supporting layer 75 of the mattress assembly 10. In this regard, air exiting the air distribution layer 30 can then easily be transferred through the body supporting layer 75 to the second surface 84 of the comfort layer 80 (i.e., the second surface of the body supporting layer 75). In the case where the air flow unit 90 provides heated or cooled air into the support insert 60 the increased air flow through the body supporting layer 75 will also improve the rate of heating/cooling at the second surface 84 of the comfort layer 80 (i.e., the second surface of the body supporting layer 75).

The base plate 32, the foam rails 40, or both the base plate 32 and foam rails 40 of the air distribution layer 30 are also comprised of a flexible foam material chosen to provide a preferred feel and support characteristic. For example, in some embodiments, the foam rails 40 can provide substantially the same feel and support as the support insert 60, whereas, in some other embodiments, the foam rails 40 provide a firmer feel than the support insert 60. Likewise, in some embodiments, the foam rails 40 can provide substantially the same feel and support as the body supporting layer 75, whereas, in some other embodiments, the foam rails 40 provides a firmer feel than the body supporting layer 75.

With respect to the base layer 20, in the exemplary embodiment show in FIGS. 1-3, the base layer 20 is also comprised of a visco-elastic foam, but other materials are also contemplated including non-viscoelastic foams. In some embodiments, the visco-elastic foam of the base layer 20 is substantially the same as the visco-elastic foam of the body supporting layer 75. In some other embodiments, the porosity of the foam used in the body supporting layer 75 is greater than the porosity of the base layer 20.

Referring now to FIGS. 2 and 3, as previously mentioned, the exemplary support insert 60 is formed of an array of springs 62. The exemplary springs are individually "pocketed" coils. Each individually pocketed coil may comprise a spring or coil wrapped or encased within a fabric cover. This cover may be known in the art as a spacer fabric, and may be permeable. In some instances, the spacer fabric comprising the cover may be formed of a bi-directionally stretched material, meaning it is stretchable in two dimensions, such as the horizontal directions, for example head to toe and laterally, side to side relative a bed. The spacer fabric may include a woven, or knit material, and/or may include extruded plastic materials including polyethylene, polyester, other plastics or combinations of any of these or others. These individually pocketed coils may then be arranged in rows or columns within a perimeter and sewn together to form a cohesive unit, for example the support insert 60. In some embodiments, the rows and columns are aligned such that each row forms a straight line and each column forms a straight line. In other embodiments, the rows and columns are arranged so as to be offset from each other, for example forming a checkerboard-like pattern. The use of pocketed coils or a pocketed coil layer may provide for a more comfortable mattress surface as the coils become relatively individually flexible, so that each coil may flex separately without affecting the neighboring coils.

In some embodiments, the springs or coils may be constructed of a steel wire, high carbon spring wire, high carbon piano wire, cooper coated high carbon wire, aluminum coated high carbon wire, cold drawn upholstery wire types "A", "B", or "C", or any other types of wire known in the art. The wire used in the construction of the springs or coils may range between 12 and 20 gauge. In other embodiments, the springs or coils may be constructed of a polymer material, for example plastic or polyurethane. In some embodiments, the springs or coils may range in diameter from about 10 millimeters to about 150 millimeters. The raw height of the springs or coils may range from about 0.5 inches to about 12 inches, and the height or the spring or coil in the pocket may also range from about 0.5 inches to about 12 inches. In some embodiments, the spring or coil preload ranges from 0 to 5 pounds of force, and spring rate ranges from 0.25 to 5.0 pounds of force per inch. In some embodiments, the coil geometry may be linear compression; while in other embodiments the coil geometry may be variable compression, linear cylindrical, or variable diameter in order to achieve variable compression. Regardless of the particular configuration, the support insert 60 is substantially air permeable such that air provided into the cavity 50 of the air distribution layer 30 spreads through the support insert 60 before flowing into and through the insulator layer 70.

Although not expressly shown, it should be understood that in other exemplary embodiments of the present invention, the support insert can also include flexible foam instead of or in addition to an array of springs. In some exemplary embodiments, a foam support insert is comprised of a visco-elastic foam similar to body supporting layer. The flexible foam material can be chosen to provide a preferred feel and support characteristic. For example, in some embodiments, a foam support insert can provide substantially the same feel and support as the foam rails of the air distribution layer whereas in some other embodiments, a foam support insert can provide a softer feel than the foam rails of the air distribution layer. Furthermore, a foam insert can include structural elements, such as channels that extend through the foam insert, to further increase air flow through the foam insert. Further still, a foam insert can be configured to provide substantially the same feel and support as the body supporting layer. It is additionally contemplated that a foam insert can include a plurality of foam layers each having various configurations including, for example, different densities, hardnesses, and/or porosities.

In order to prevent the various layers of the mattress assembly 10 from moving relative to one another during use, various means of securing one layer of material to another can be used including tape, hook and loop fasteners, conventional fasteners, stitches, adhesive, and the like. Such adhesive bonding materials include, for example, environmentally-friendly, water based adhesives, like SABA AQUABOND RSD, a two-component water-based adhesive product produced by SABA DINXPERLO BV, B-7090 AA, Dinxperlo, Belgium.

Figure 5A:
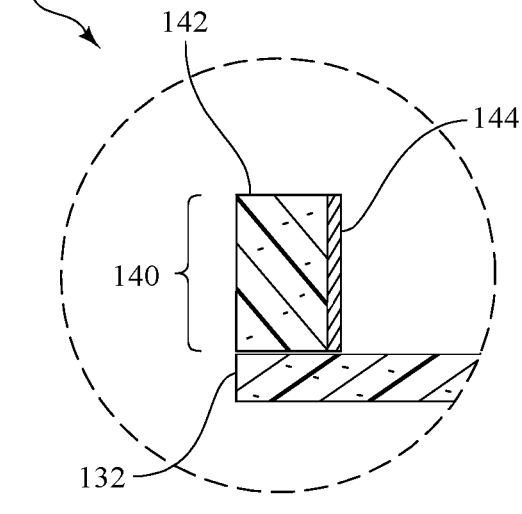
FIG. 5A is a detailed view of another exemplary foam rail.

Referring now to FIG. 5A, in another exemplary embodiment of the present invention, the exemplary foam rails 140 of the air distribution layer 130 include an outer foam layer 142 and an impermeable or semipermeable coating 144 instead of an inner foam lining. In this regard, the term "impermeable coating" is used herein to generally refer to materials which substantially prevent air from flowing through the coating, and the term "semipermeable coating" is used herein to generally refer to materials which prevent at least a portion of air from flowing through the material, which may for example include low permeable materials. For example a low permeable material may have air permeability between 0-5 $ft^3/ft^2/min$, between $ft^3/ft^2/min$, or between 0-20 $ft^3/ft^2/min$. The exemplary coating 144 may include, but is not limited to, a hot melt glue, a flexible elastomer coating, or a gel like material. With respect to hot melt glue, in some embodiments, a water based hot melt glue is used which creates a non-tacky impermeable layer when dried. The hot melt glue must be viscous enough to bridge the foam cell structures when applied in order to create the coating over the foam rather than sink into the foam cell structures. According to some embodiments, a viscosity of at least 100 centipoise is considered sufficiently viscous for application. The overall thickness of an exemplary hot melt glue layer is between 0-0.100" which may, in some instances, require more than one coating pass to achieve the desired thickness. The exemplary hot melt glue must also be flexible enough when dried to avoid cracking during repeated load cycling (e.g., compression) of the foam during use of the mattress. Similar properties are contemplated for embodiments in which the coating is made of a flexible elastomer or gel. According to some embodiments, the coating is formed by heating/melting the foam itself to form a "skin" which likewise exhibits similar properties to the exemplary hot melt glue discussed above.

Figure 5B:
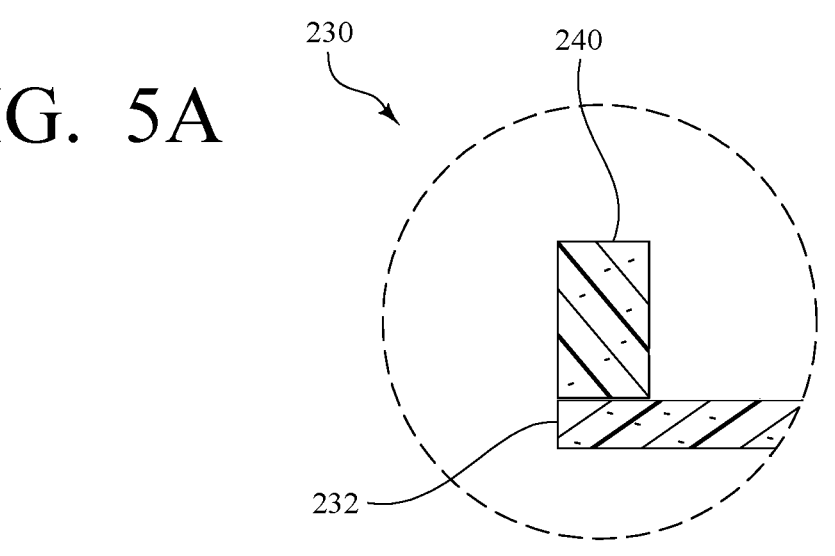
FIG. 5B is a detailed view of yet another exemplary foam rail.

Referring now to FIG. 5B, in another exemplary embodiment of the present invention, rather than the foam rails including both an outer foam layer and an inner foam lining or coating, in the exemplary air distribution layer 230 shown in FIG. 5B, the foam rail 240 is made of a single foam piece. According to this embodiment, the foam rail 240 is comprised of a foam which is substantially air impermeable without the addition of an inner foam lining or coating.

In the exemplary embodiments shown in FIGS. 1-5A, the foam rails 40, 140, 240 are affixed to the base plate 32, 132, 232, for example, by an adhesive; however, it is contemplated that, in some instances, the foam rails and the base plate are formed from a single piece of flexible foam, such that the base layer is characterized as having a unitary construction. This is particularly advantageous in embodiments where the foam rails are made of a single foam piece without any additional inner lining or coating, as the air distribution layer can be formed by carving the cavity out of a unitary piece of foam such that the base plate and foam rails are integrally formed. According to these embodiments, the foam block into which the cavity is carved to form is preferably made of a foam that is substantially air impermeable or has low permeability, e.g., air permeability between 0-0.05 l/sec.

Figure 6:
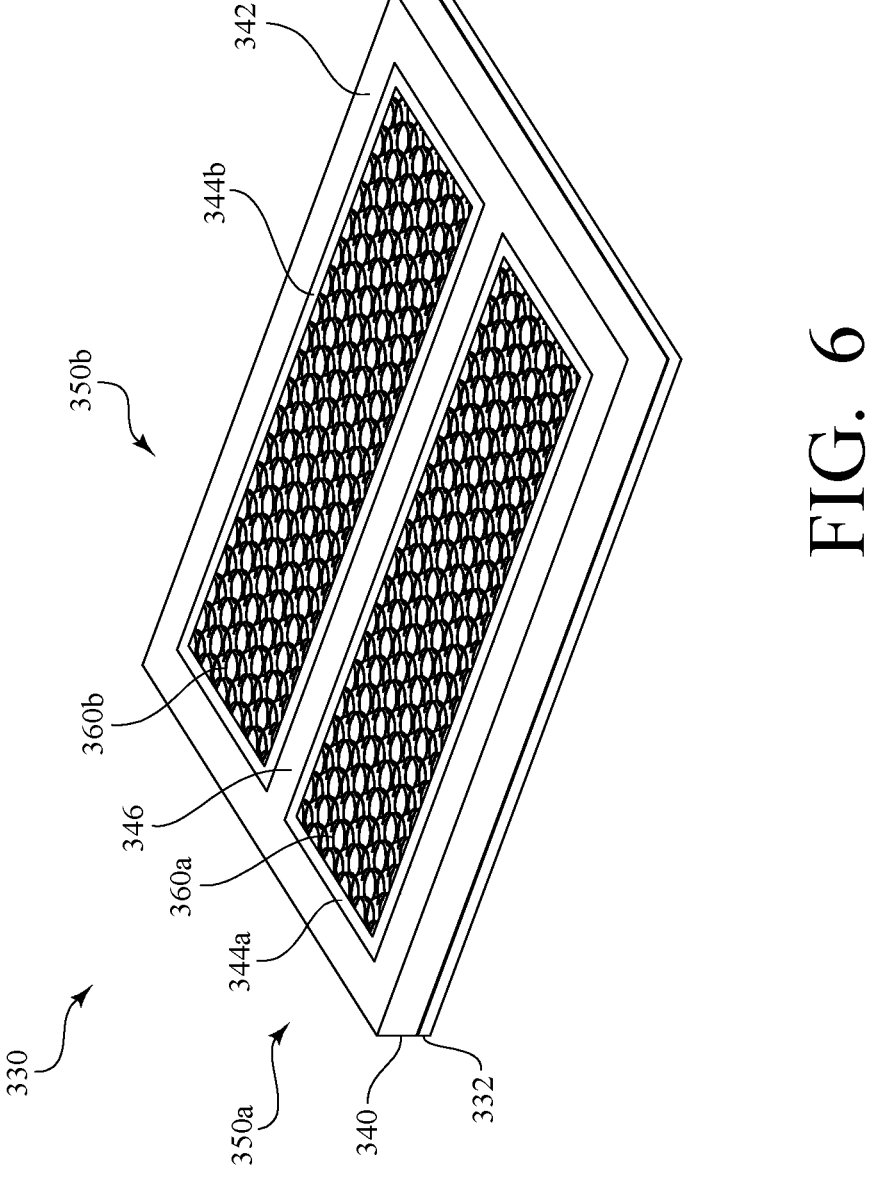
FIG. 6 is a perspective view of another exemplary air distribution layer made in accordance with the present invention.

In the embodiments shown in FIGS. 1-3, there is only one cavity 50 with a corresponding support insert 60 which extend across substantially all of the top of the air distribution layer 30, but it is appreciated that the embodiments described herein need not be limited to a single cavity. For instance, and referring now to FIG. 6, in another embodiment of the present invention, an exemplary air distribution layer 330 defines two cavities 350a, 350b and corresponding support structures 360a, 360b. More specifically, the foam rails 340 include in addition to the outer foam layer 342 positioned around the perimeter of the base plate 332, similar to the outer foam layer 42 of the exemplary foam rails 40 described above with reference to FIGS. 1-4, an intermediate foam rail 346 also extends along substantially the center of the air distribution layer 330 dividing the air distribution layer 330 into a left side and a right side. A separate inner foam lining 344a, 344b is then located within each cavity 350a, 350b with the inner foam linings 344a, 344b being substantially air impermeable similar to the inner foam lining 44 described above with reference to FIGS. 1-4. By modifying the number and location of the cavities and support structures positioned across the air distribution layer, air is directed out of the support structures and through the body supporting layer in a predetermined pattern.

It is also to be understood that although the exemplary body supporting layer 75 illustrated in FIGS. 1-3 contains the insulator layer 70 and the comfort layer 80, this is not intended to be limiting. In some embodiments, a body supporting layer may comprise only a single layer or other layer(s) instead of or in addition to the insulator layer 70 and comfort layer 80 described above.

Likewise, although in the embodiments shown in FIGS. 1-3, there is a single inlet hole 34 in the base plate 32 of the air distribution layer 30, it is contemplated that multiple inlet holes can also be used without departing from the spirit and scope of the present invention. It is further contemplated that the inlet can be located on the side of the air distribution layer 30 with a corresponding hole defined through the foam rail 40 of the air distribution layer. Further still, although in the embodiments shown in FIGS. 1 and 2, the air flow unit 90 is connected by the conduit 92 such that the air flow unit 90 is positioned a distance away from the rest of the mattress assembly 10, other positions are contemplated including mounting the air flow unit 90 to the base layer 20 and/or within the confines of the mattress assembly 10.

As an additional refinement, to ensure that fresh air is entering the base layer, the mattress assembly can further include a filter, such that only filtered air is allowed to pass into the inlet hole and the bag is kept free of particulates such as smoke, dust, dirt, pollen, mold, bacteria, hair, or insects that may otherwise collect in the interior of the mattress and limit air flow. Of course, it is contemplated that various types of filters including, but not limited to, charcoal filters for removing chemicals and/or unpleasant odors can be readily incorporated into an exemplary mattress of the present invention without departing from the spirit and scope of the subject matter described herein. In some embodiments, it is further contemplated that air freshener or perfume may further be added to the assemblies (e.g., before the fan) such that scented air is directed to the surface of the support cushion assemblies.

Each of the exemplary support cushions described herein can also be used as part of a method of controlling a surface temperature of a support cushion. In some implementations, a method of controlling the surface temperature of a support cushion includes first providing a support cushion of the present invention. Electrical current is then supplied to the air flow unit such that the fan of the air flow unit pushes an amount of air into the cavity of the air distribution layer, through the support insert, through the body supporting layer and out of the second surface of the body supporting layer. For implementations where air flow unit includes a heating unit and/or a cooling unit, electrical current can also be supplied to the heating/cooling unit such that the temperature of the air flowing out of the first surface of the body supporting layer is adjusted.

EXAMPLE

Figure 7:
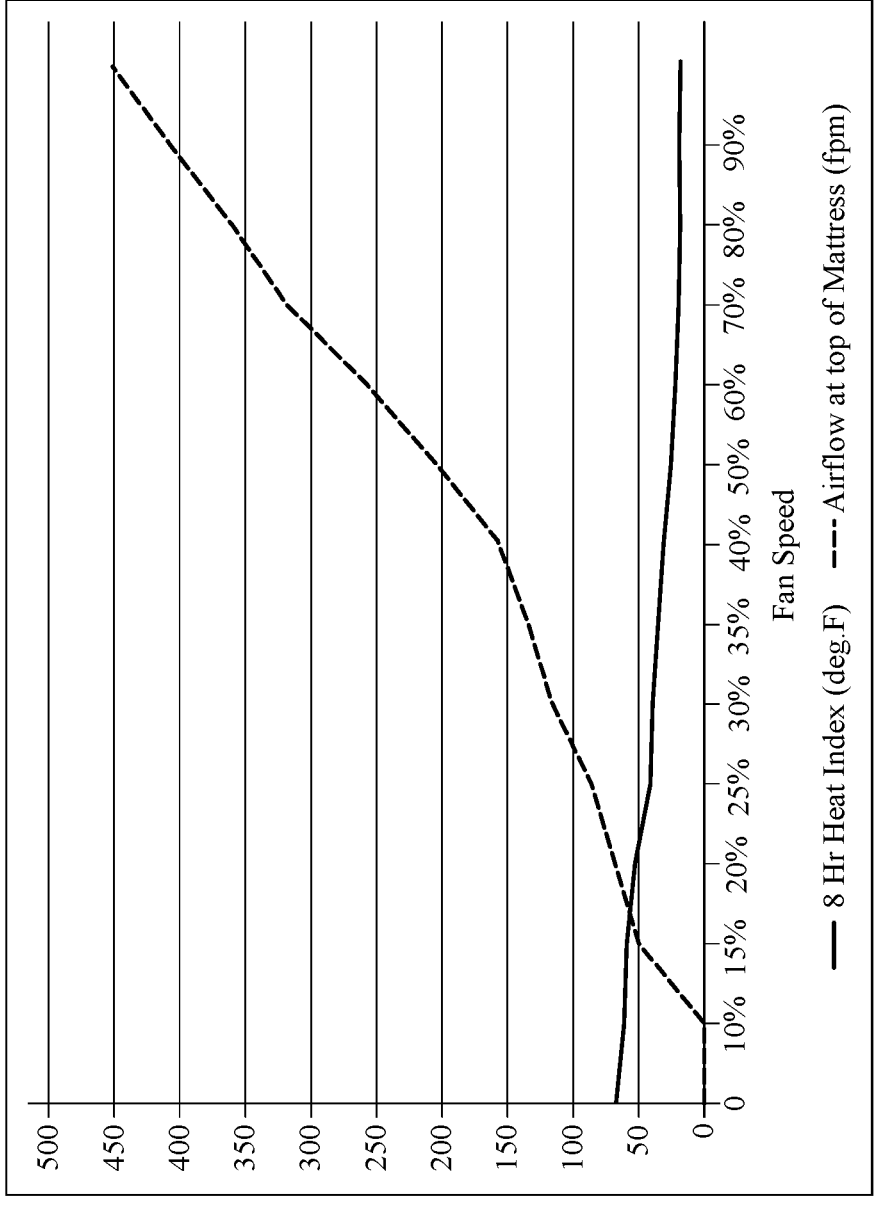
FIG. 7 is a graph showing operation characteristics of one exemplary fan.

Referring now to Table 1 below and FIG. 7, one exemplary fan with an air flow of about 38.5 CFM and water static pressure of about 28.7 mm was used in conjunction with an exemplary mattress made in accordance with the present invention. The fan was operated at different fan speeds with an apparatus positioned on the mattress to provide heat and moisture that simulated a user sleeping on the mattress. Measurements were then taken at the surface of the mattress for each fan speed 5 minutes, 20 minutes, and 8 hours into testing. As shown, without the use of the fan (e.g., a fan speed of 0), the temperature at the surface of the mattress increased significantly between each of the 5 minute, 20 minute, and 8 hour measurements ultimately reaching a 67.6° F. increase after the full 8 hours. By comparison, even with the fan only operating at 50% fan speed, the temperature at the surface of the mattress increased by only 26° F. after the full 8 hours, and at fan speeds of 80% and greater the temperature at the surface of the mattress increased by less than 20° F.

TABLE 1

| Fan Speed | 5 min Heat Index Increase (deg. F.) | 20 min Heat Index Increase (deg. F.) | 8 hr Heat Index Increase (deg. F.) | Airflow at top of Mattress (fpm) |
|---|---|---|---|---|
| 0 | 18.2 | 40 | 67.6 | 0 |
| 10% | 18.7 | 38.8 | 61.7 | 0 |
| 15% | 18.3 | 37.7 | 58.9 | 50 |
| 20% | 17 | 34.2 | 52.9 | 68 |
| 25% | 12.5 | 28 | 41.6 | 87 |
| 30% | 14.8 | 29.1 | 39.9 | 117 |
| 35% | 13.4 | 26.3 | 35.7 | 135 |
| 40% | 15.1 | 24.4 | 31.2 | 158 |
| 50% | 13.8 | 21.3 | 26 | 207 |
| 60% | 13 | 18.8 | 22.3 | 260 |
| 70% | 12.7 | 17.5 | 20 | 320 |
| 80% | 11.4 | 16.3 | 18.7 | 362 |
| 90% | 12.7 | 16.5 | 19.3 | 409 |
| 100% | 12.5 | 15.9 | 18.4 | 454 |

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A method of controlling air flow through a support cushion, comprising the steps of:

providing a support cushion having a body supporting layer having a first surface and a second surface opposite the first surface;

an air distribution layer positioned adjacent to the first surface of the body supporting layer, the air distribution layer including a base plate and foam rails positioned at least around a perimeter of the base plate to define a cavity with a support insert positioned within the cavity; and a fan operably connected to the air distribution layer, the fan for providing air flow into the cavity of the air distribution layer;

supplying an electrical current to the fan such that the fan pushes an amount of ambient air into the cavity of the air distribution layer; and moving the amount of ambient air through the support insert, through the body supporting layer, and out of the second surface of the body supporting layer, wherein the foam rails are comprised of a substantially air impermeable foam and the support insert is substantially air permeable such that the ambient air moves into the cavity of the air distribution layer and spreads through the support insert before flowing into and through the body supporting layer.

2. A support cushion, comprising:

a body supporting layer having a first surface and a second surface opposite the first surface;

an air distribution layer positioned adjacent to the first surface of the body supporting layer, the air distribution layer including a base plate and foam rails positioned at least around a perimeter of the base plate to define a cavity, and the air distribution layer further including a support insert positioned within the cavity; and a fan operably connected to the air distribution layer, the fan for providing air flow into the cavity of the air distribution layer such that the air flow is directed through the support insert and into and through the body supporting layer, wherein the foam rails are comprised of a substantially air impermeable foam and the support insert is substantially air permeable such that air provided into the cavity of the air distribution layer spreads through the support insert before flowing into and through the body supporting layer.

3. The support cushion of claim 2, wherein the foam rails prevent air flowing out of the air distribution layer except through the body supporting layer.

4. The support cushion of claim 2, wherein the foam rails include an outer foam layer and an inner foam lining, the inner foam lining defining a side surface of the cavity of the air distribution layer.

5. The support cushion of claim 4, wherein the inner foam lining is substantially air impermeable.

6. The support cushion of claim 2, wherein the foam rails include an air impermeable coating along at least a side surface of the cavity of the air distribution layer.

7. The support cushion of claim 2, wherein the air distribution layer is formed by carving the cavity out of a unitary piece of foam such that the base plate and foam rails are integrally formed.

8. The support cushion of claim 2, wherein the support insert includes an array of springs, the array of springs configured to support the body supporting layer.

9. The support cushion of claim 2, wherein the support insert includes one or more foam layers, the one or more foam layers configured to support the body supporting layer.

10. The support cushion of claim 2, wherein the body supporting layer defines a plurality of channels extending from the first surface to the second surface, the plurality of channels substantially aligned with the cavity of the air distribution layer.

11. The support cushion of claim 2, wherein the body supporting layer includes an insulator layer positioned adjacent to the air distribution layer and a comfort layer positioned adjacent to the insulator layer opposite from the air distribution layer.

12. The support cushion of claim 11, wherein the insulator layer, the air distribution layer, or both the insulator layer and the air distribution layer are comprised of a visco-elastic foam.

13. The support cushion of claim 2, wherein the body supporting layer is comprised of a visco-elastic foam.

14. The support cushion of claim 2, wherein the base plate of the air distribution layer defines a hole and a conduit directs air from the fan through the hole and into the cavity of the air distribution layer.

15. The support cushion of claim 2, further comprising a base layer positioned adjacent to a lower surface of the base plate;

wherein the foam rails are positioned along an upper surface of the base plate opposite the lower surface; and wherein the base layer defines a hole, the base plate of the air distribution layer defines a hole aligned with the hole of the base layer, and a conduit directs air from the fan through the hole of the base layer, through the hole of the base plate of the air distribution layer, and into the cavity of the air distribution layer.

16. The support cushion of claim 2, further comprising a heating unit, a cooling unit, or both a heating unit and a cooling unit configured to provide thermally controlled air flow into the cavity of the air distribution layer.

17. A method of manufacturing a support cushion, comprising the steps of:

provided an air distribution layer defining a cavity on a top of the air distribution layer, the cavity having a bottom surface and side surface;

positioning a support insert within the cavity on the bottom surface of the cavity with the side surface of the cavity surrounding the support insert such that only an upper side of the support insert opposite from the bottom surface of the cavity is left exposed; and positioning a body supporting layer over the top of the air distribution layer, the body supporting layer having a first surface and second surface opposite the first surface and defining a plurality of channels extending from the first surface to the second surface, the plurality of channels substantially aligned with the cavity of the air distribution layer;

wherein the side surface of the cavity of the air distribution layer is comprised of a substantially air impermeable foam and the support insert is substantially air permeable, such that air provided into the cavity of the air distribution layer spreads through the support insert before flowing into and through the body supporting layer.

18. The method of claim 17, wherein the step of providing the air distribution layer includes carving a cavity out of a unitary piece of foam to form the air distribution layer, wherein the unitary piece of foam is substantially air impermeable.

19. The method of claim 17, wherein the step of providing the air distribution layer includes:

providing a base plate; and positioning foam rails around a perimeter of the base plate so as to define the cavity.

20. The method of claim 19, further comprising a step of applying a coating to the foam rails to form an air impermeable coating on the side surface of the cavity.

21. The method of claim 19, further comprising a step of heating the foam rails to form an air impermeable coating on the side surface of the cavity.

* * * * *